UNITED STATES PATENT OFFICE.

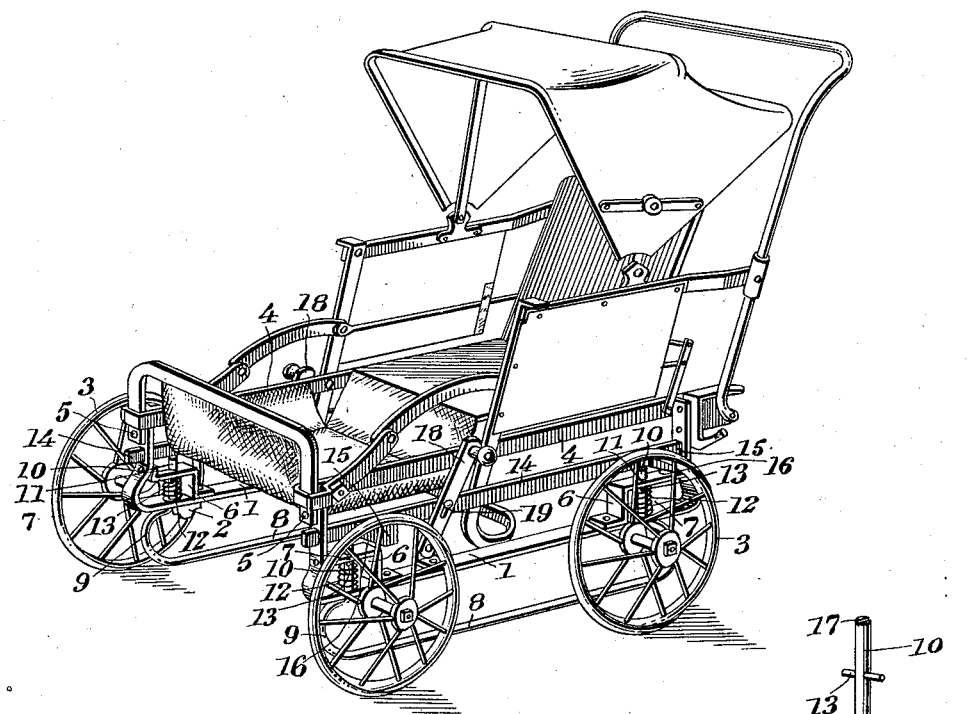

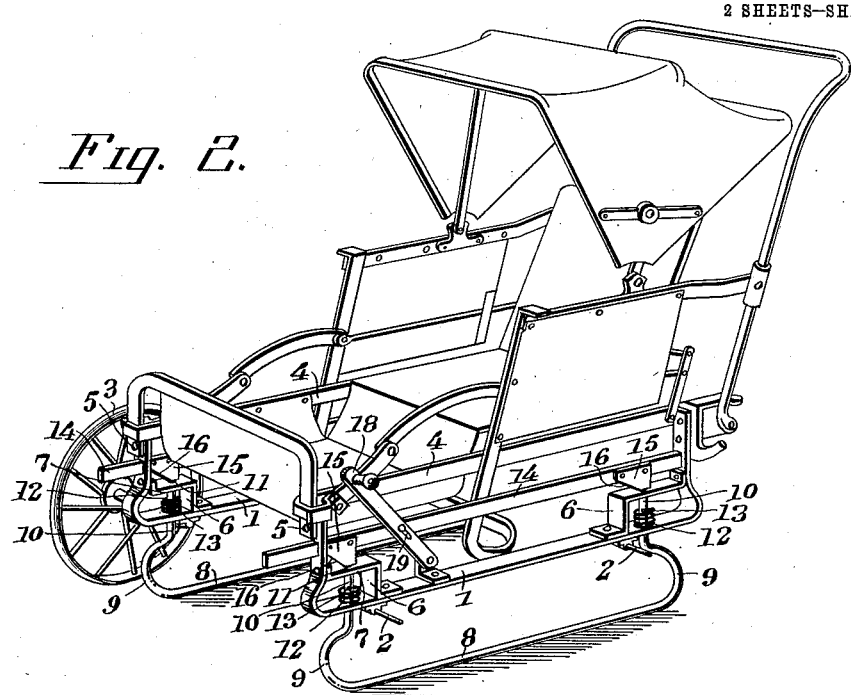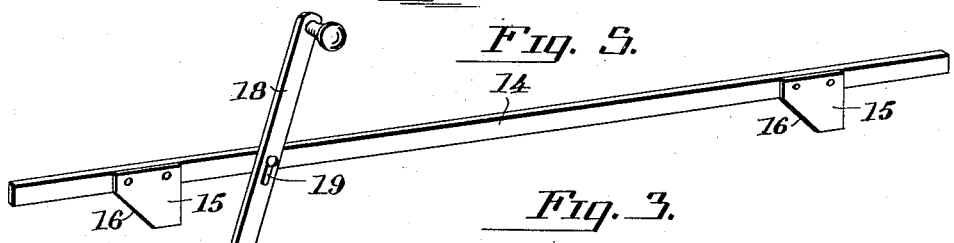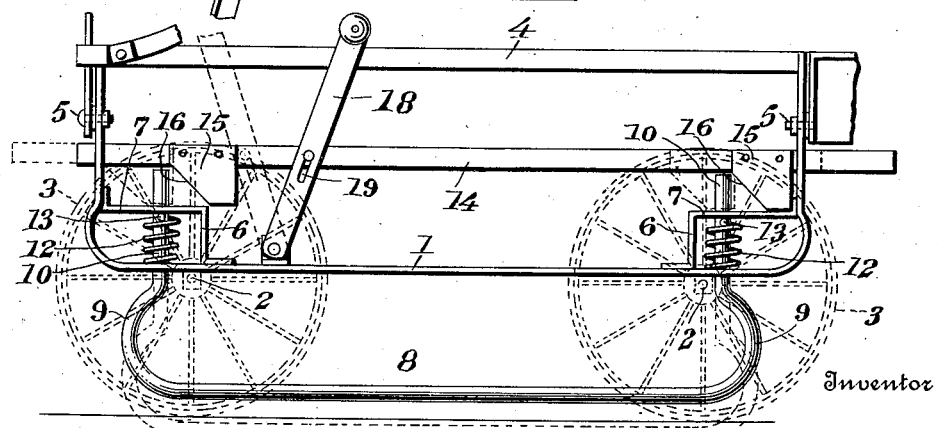

CHARLES B. MERCER, OF WEST PITTSTON, PENNSYLVANIA.

COLLAPSIBLE GO-CART.

1,084,465. Specification of Letters Patent. Patented Jan. 13, 1914.

Application filed November 21, 1912. Serial No. 732,698.

*To all whom it may concern:*

Be it known that I, CHARLES B. MERCER, a citizen of the United States, residing at West Pittston, in the county of Luzerne and State of Pennsylvania, have invented new and useful Improvements in Collapsible Go-Carts, of which the following is a specification.

The invention relates generally to an improvement in baby carriages, go-carts or similar vehicles and particularly to means whereby such vehicle may be readily and conveniently converted from a wheeled vehicle to a runner vehicle, permitting in the use of the carriage or go-cart either the runners or wheels as a support.

The main object of the present invention is the provision of runners constructed and arranged for convenient connection to the ordinary type of go-cart or similar wheeled vehicle, and the provision of means for operating the runners to project them into a plane below the plane of the wheels or to permit their elevation into a plane above the wheel plane.

The invention in the preferred form of details will be described in the following specification, reference being had particularly to the accompanying drawings, in which:

Figure 1 is a perspective view of the improved combined sleigh and go-cart, showing the same in use as a go-cart. Fig. 2 is a similar view showing same in use as a sleigh. Fig. 3 is a side elevation of one side frame of the vehicle illustrating particularly the operating means for the runner. Fig. 4 is a perspective view of the runner detached. Fig. 5 is a perspective view of the operating bar of the runner.

While I have shown and will describe the present improvement as designed particularly for coöperation with a folding type of go-cart, it is to be understood that the invention is in no wise limited to such application, but may be incorporated with equal efficiency and facility and with such mechanical changes of details as may be necessary and in any preferred or usual type of go-cart, baby carriage, or similar wheeled vehicle.

In the application of the invention to a folding type of go-cart illustrated, it will be noted, from the accompanying drawing, that the main frame bar 1 which is designed to support the stub axles 2 for the wheels 3, and is of U-shape for pivotal connection to the upper frame 4, as at 5, whereby to provide for folding the wheels beneath the upper frame, is designed to provide the support for the entire improved structure. Each main frame bar 1 is provided at each end adjacent the juncture of the horizontal and normally vertical portions of said bar with frame strips 6 of approximately L form with their terminals connected to the horizontal and vertical portions of the main frame bar and forming when connected what may be termed approximately rectangular frame housings 7.

The runner proper comprises a single rod like section formed to provide a substantially straight runner section or bearing length 8 having the ends projected upwardly in substantially rounded form at 9, and extended above the terminals of the rounded ends in straight bearing sections 10, the latter being substantially at right angles to the bearing sections 8. The bearing sections 10 are designed to pass loosely through openings 11 formed in the respective horizontal or longitudinally extending portions of the frame housing 7, the bearing sections 10 being freely slidable through openings 11 and under which sliding movement the runners proper are moved in a vertical plane in parallel relation to the plane of the side wheels of the vehicle.

Intermediate the longitudinal sections of the frame housing 7 there is arranged a coil spring 12 bearing at one end against the normally lower wall of the housing and at its upper end against a pin 13, secured in the bearing section 10, the springs being tensioned to normally hold the runners elevated, that is with their bearing portions in a plane above the bearing point of the wheeled peripheries.

Mounted for sliding longitudinal movement in the upright portions of the main frame bearing 1 is an operating bar 14, said bar being freely slidable longitudinally of the go-cart and in a plane parallel to the plane of the normally horizontal portion of the main frame bar. Secured to the operating bar at a point immediately adjacent the upper ends of the bearing portions 10 of the runner are wedge plates 15, having their lower edges formed throughout their forward portions to provide downwardly and rearwardly inclined portions 16 and the remaining portions of such edges substantially horizontal or in parallelism to the horizontal section of the main frame bar 1. The wedge plates 15 are comparatively thin and their lower or operating edges are designed to seat within and at all times operatively engage slots 17 formed in the upper ends of the bearing portions 10 of the runners.

An operating lever 18 is pivotally connected at its lower end to the horizontal portion of each frame bar and provided at its upper end with operating knob or handle, said lever intermediate its ends being connected by a pin and slot connection 19 to the operating bar 14.

In operation with the operating bar withdrawn to its limited rearward movement, it will be obvious that the springs 12 will serve to hold the runners normally elevated above the ground contacting point of the wheels, so that said wheels will serve as supporting medium for the go-cart, or in other words, the latter will be of the usual wheeled type. On proper operation of the levers 18, the operating bar will be moved in forward direction, the inclined edges of the wedge plates engaging the bearing portions 10 with the effect to gradually force same downwardly to expose the main length of the runner below the operating plane of the wheels, the continued movement of the operating bar causing the relatively horizontal portion of the wedge plate to engage the upper ends of the bearing portions of the runners and thus secure the runners in lowered position. The wheels are then above ground contacting position and the go-cart or the like is supported on the runners for use as a sleigh or the like. The lever 18 is so mounted that in the normal or inoperative position of the runners the pivoted end of the lever is in advance of the pivotal connection of the lever and operating bar, while on the depressed or operative position of the runners said pivotal connection of the lever is in rear of the connection between said lever and operating bar, the longitudinal movement of the operating bar providing this arrangement. Under these circumstances, the weight of the go-cart and occupant will tend to maintain the runner in its operative position, as will be obvious. The runners may be returned to normal or inoperative position by the reverse movement of the handle ends of the levers.

By connecting the runners and operating bars in the main frame bar of the running gear of the vehicle, it is obvious that the go-cart may be readily folded in the usual manner without such operation being in any way interfered with by the improved construction.

The improved go-cart or the like may through the medium of the construction described be readily and simply converted from a wheeled vehicle to a runner vehicle, thereby providing in effect a wheeled go-cart and runner go-cart in one vehicle, by the provision of few parts without complication and requiring only the operation of two levers for effecting the change from one type of vehicle to the other.

What is claimed is:

1. A go-cart or the like including a wheel carrying frame bar, a runner having sections slidably mounted in said bar, an operating bar slidably mounted and operative longitudinally in the frame bar and engaging the sections, wedge plates carried by the operating bar to engage the sections, and said wedge plates having their operating edges inclined in part and approximately horizontal in part.

2. A go-cart or the like including a wheel carrying frame bar, a runner having sections slidably mounted in said bar, an operating bar slidably mounted and operative longitudinally in the frame bar and engaging the sections, wedge plates carried by the operating bar to engage the sections, said wedge plates having their operating edges inclined in part and approximately horizontal in part, the upper ends of the runner sections being slotted to receive the operating edges of the wedge plates.

3. A go-cart or the like including a wheel carrying frame bar, a runner having sections slidably mounted in said bar, an operating bar slidably mounted in the frame bar and engaging the sections, wedge plates carried by the operating bar to engage the sections, said wedge plates having their operating edges inclined in part and approximately horizontal in part, the upper ends of the runner sections being slotted to receive the operating edges of the wedge plates, and handle levers for actuating said operating bar.

In testimony whereof I affix my signature in presence of two witnesses.

CHARLES B. MERCER.

Witnesses:
H. E. GRIER,
L. J. CONNORS.

Copies of this patent may be obtained for five cents each, by addressing the "Commissioner of Patents, Washington, D. C."